United States Patent
Reinhardt et al.

(10) Patent No.: US 6,452,610 B1
(45) Date of Patent: *Sep. 17, 2002

(54) METHOD AND APPARATUS FOR DISPLAYING GRAPHICS BASED ON FRAME SELECTION INDICATORS

(75) Inventors: Dennis Reinhardt, Palo Alto; Siripong Sritanyaratana, Union City, both of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,013

(22) Filed: Dec. 16, 1998

(51) Int. Cl.[7] ................................. G06F 3/14
(52) U.S. Cl. .............. 345/716; 345/723; 345/776; 345/839; 345/720; 345/619; 382/233; 382/235
(58) Field of Search ............... 345/350, 348, 345/349, 327, 340, 328, 720, 776, 835, 839, 716, 718, 781, 723, 619; 382/232, 233, 235

(56) References Cited

U.S. PATENT DOCUMENTS

| | | | |
|---|---|---|---|
| 3,889,054 A | * | 6/1975 | Nagel et al. ............. 348/486 |
| 5,552,824 A | * | 9/1996 | DeAngelis et al. ........ 348/157 |
| 6,173,317 B1 | * | 1/2001 | Chaddha et al. ............ 709/219 |
| 6,177,933 B1 | * | 1/2001 | Young ...................... 345/333 |
| 6,202,061 B1 | * | 3/2001 | Khosla et al. .............. 345/350 |

* cited by examiner

Primary Examiner—Kristine Kincaid
Assistant Examiner—Thomas T. Nguyen
(74) Attorney, Agent, or Firm—Peter Lam

(57) ABSTRACT

A method for displaying graphics in a computer system. In one embodiment, the method includes a step of receiving a stream of data into the main memory of the computer system. This stream of data comprises a series of descriptions of digital video frames and a series of indicators, each of which corresponds to a set, or a group of one or more, of the video frame descriptions. Each indicator indicates a basis for selecting a subset of the set of video frame descriptions. For example, in one embodiment thirty video frame descriptions are in each set, and a given indicator indicates that half of those thirty descriptions should be included in the corresponding subset. Then, only the fifteen video frame descriptions selected for inclusion in the subset are decompressed, and only the fifteen resulting video frames are displayed, while the other fifteen frames are dropped. By reducing the total number of frame descriptions to be decompressed and displayed, system activity can be reduced, thereby reducing the possibility that power management utilities will be invoked. By using the indicator as the basis for determining when to drop frames and/or which frames are to be dropped instead of allowing power management utilites to make the determination, the video as displayed can be improved according to some predetermined policy.

16 Claims, 2 Drawing Sheets

METHOD AND APPARATUS FOR DISPLAYING GRAPHICS BASED ON FRAME SELECTION INDICATORS

FIELD OF THE INVENTION

The present invention relates to the field of computer graphics and more particularly to the field of reduced power digital video playback.

BACKGROUND OF THE INVENTION

As the processing power and the data handling capacity of computer systems increases, a growing number of uses for computer systems include the playback of digital video. Typically, digital video playback involves four activities, (1) receiving compressed video data into the main memory of the computer system, (2) decompressing the compressed video data, (3) transferring the decompressed video data to a display memory, and (4) displaying the decompressed video data. These four activities occur repeatedly throughout the playback period, keeping most of the computer system continuously active. One problem with this high level of system activity is that power management utilities might be invoked, causing a noticeable effect on system performance, such as a "jerky" picture. This problem can make certain applications of computer systems, such as the playback of a movie on a portable computer system, impractical. In response to this problem, a novel approach to displaying video in a computer system has been developed.

SUMMARY OF THE INVENTION

A method of displaying graphics in a computer system is disclosed. In one step, the first of a set of graphical descriptors is received. Each graphical descriptor corresponds to a graphical image. In another step, a subset of the set of graphical descriptors is selected based on an indicator. In another step, the graphical images corresponding to the subset of graphical descriptors are displayed.

DETAILED DESCRIPTION OF THE PREFERRED EMBODIMENT

A method and apparatus for displaying graphics in a computer system is described. In the following description, specific details are set forth in order to provide a thorough understanding of the present invention. It will be apparent, however, to one skilled in the art that the present invention can be practiced without regard to these specific details. In other instances, well known concepts have not been described in particular detail in order to avoid obscuring the present invention.

One embodiment of the present invention is a method for displaying video in a computer system. The method includes a step of receiving a stream of data into the computer system. This stream of data comprises a series of descriptions of digital video frames and a series of indicators, each of which corresponds to a set, or a group of one or more, of the video frame descriptions. Each indicator indicates a basis for selecting a subset of the set of video frame descriptions. For example. in one embodiment, thirty video frame descriptions are in each set, and a given indicator indicates that half of those thirty descriptions should be included in the corresponding subset. Then, only the fifteen video frame descriptions selected for inclusion in the subset are decompressed, and only the fifteen resulting video frames are displayed, while the other fifteen frames are dropped (i.e. not displayed, and/or replaced).

By reducing the total number of frame descriptions to be decompressed and displayed, system activity can be reduced, thereby reducing the possibility that power management utilities will be invoked. By using the indicator as the basis for determining when to drop frames and/or which frames are to be dropped instead of allowing power management utilites to make the determination, the video as played can be improved according to some predetermined policy. This predetermined policy can be an artistic, commercial, moral, educational, or other policy, and can be objective or subjective. The policy can be used to manually or automatically generate the series of indicators according to criteria conforming to the policy. For example, one criterion could be to drop all frames showing tobacco products or guns. Another criterion could be to favor frames showing a certain actress or frames included in action scenes. Any number of series of indicators can be associated with a single video, such that the video can be played for a person or a group of people according to a policy that they prefer.

Figure 1:
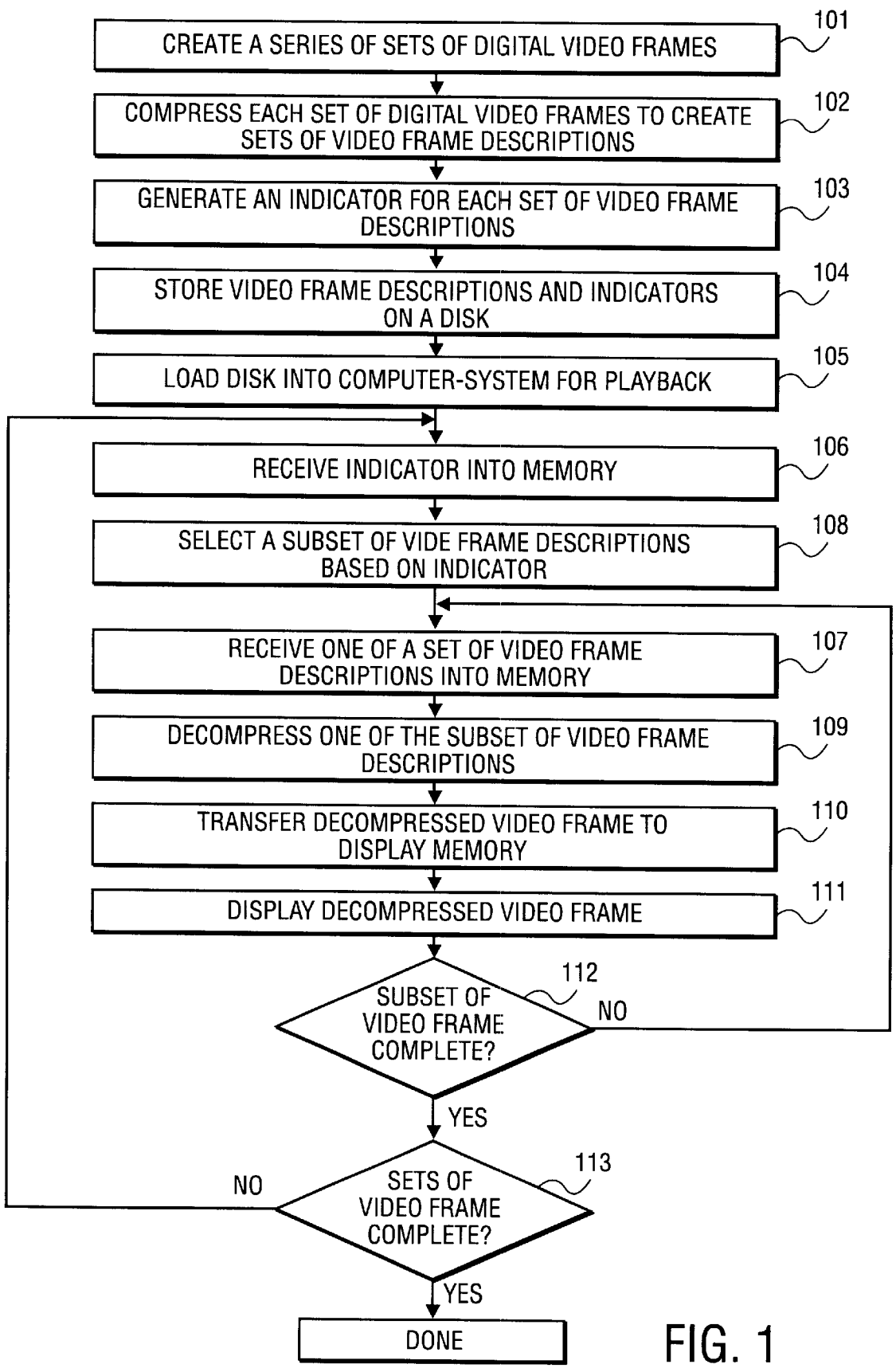
FIG. 1 is a flow chart illustrating one embodiment of the method of the present invention.

FIG. 1 is a flow chart of one embodiment of a method of the present invention. In step 101, a series of digital video frames is created by well known techniques, such as but not limited to video capture of a series of analog video frames or video recording using a digital video camera. The series of digital video frames can include any number of frames. In one embodiment, the series of digital frames includes 216,000 frames, representing thirty frames per second of a two hour long movie. For explanatory purposes, this series of 216,000 frames can be conceptually divided into a series of sets of frames. In one embodiment, the series of 216,000 frames is conceptually divided into a series of 7,200 sets of frames, each set consisting of thirty frames and corresponding to one second of video.

In step 102, the 7,200 sets of digital video frames are compressed to create 7,200 sets of video frame descriptions. Step 102 preferably includes both interframe and intraframe compression. Any compression technology, including hardware technologies such as MPEG (Motion Picture Experts Group), DVI (Digital Video Interactive), and motion JPEG (Joint Photographers Experts Group), and software technologies such as Indeo (Intel Corporation's Video Technology), Cinepak (Compression Technology Incorporated's Video Compressor), and QuickTime (Apple Corporation's Multimedia Architecture), or any combination of compression technologies can be used.

In step 103, an indicator is generated for each set of video frame descriptions. During step 103, the video frames can be used or processed in any of a variety of ways, for example, in a forward sequential fashion typical of video viewing, or in a reverse or scrambled fashion.

The purpose of each indicator is to indicate a basis for selecting a subset of video frames to be displayed from the corresponding set of video frames. Many bases for selecting the subset can be used. One such basis is an identification of each frame from the set to be displayed or dropped. In one embodiment, wherein the number of frames per set is thirty, the indicator includes thirty bits, each bit corresponding to one of the thirty frames, and each bit being set to a logical high level if the corresponding frame is to be displayed and set to a logical low level if the corresponding frame is to be dropped. In another embodiment, wherein the number of frames per set is one, the indicator includes one bit that is set to a logical high level if the frame in the corresponding set is to be displayed and set to a logical low level if the frame is to be dropped.

Another basis for selecting the subset is a direct indication of a numerical quantity of frames to be displayed. In one embodiment, wherein the number of frames per set is thirty, the indicator includes five bits encoding a value ranging from zero to thirty, wherein the encoded value represents either the number of frames to be displayed or dropped.

Another basis for selecting the subset is an indirect indication of a numerical quantity of frames to be displayed, such as an indication of the frequency at which frames are to be dropped or displayed. In one embodiment, wherein the number of frames per set is thirty, the indicator includes three bits encoding a value ranging from zero to seven. When the encoded value is zero, all frames are to be dropped (i.e. the subset consists of zero frames). When the encoded value is one, every tenth frame is to be displayed (i.e. if the frames are numbered from one to thirty, the subset consists of frames ten, twenty, and thirty). When the encoded value is two, every fifth frame is to be displayed. When the encoded value is three, every third frame is to be displayed. When the encoded value is four, every odd frame is to be displayed. When the encoded value is five, every third frame is to be dropped. When the encoded value is six, every fifth frame is to be dropped. When the encoded value is seven, all frames are to be displayed.

Another basis for selecting the subset is another indirect indication of a numerical quantity of frames to be displayed, such as an indication of the type of frame to be dropped. In one such embodiment, there are ten MPEG frames per set. The three types of frames according to the MPEG standard are index (I) frames, predictive (P) frames, and bidirectional (B) frames. The characteristics of these frame types are well known in the art. In this embodiment, the type of each of the ten frames in each set is defined by the series I-B-B-P-B-B-P-B-P. Then, the indicator includes two bits encoding a value ranging from zero to three. When the encoded value is three, no frames are dropped. When the encoded value is two, all of the B frames are dropped. When the encoded value is one, all of the B and P frames are dropped. When the encoded value is zero, all frames are dropped.

Again, many bases for selecting the subset can be used. These bases include any of the bases described above, any variation of the bases described above, and any combination of the bases described above and/or variations thereof. Within the scope of the present invention, the subset size is not limited, and can vary from set to set.

Within the scope of the present invention, the generation of the indicators can be based on some predetermined policy or any of a variety of considerations, such as, but not limited to, considerations of artistic selection or content. Unlike conventional approaches to reducing system activity during video playback, wherein the determination of which frames to drop is made at run time, the present invention provides for the determination of which frames to drop to be made prior to run time. Therefore, the video as played can be improved according to some predetermined policy. Also, the determination of which frames to drop can be made by anyone at any time, and is not limited by the playback machine or by the desires or intent of the creators of the video.

In generating the value of the indicator for any given set of frames, one goal may be to increase picture quality during playback according to some predetermined policy. Another goal may be to reduce system activity during playback. These two goals can be in competition, because reduced system activity can be achieved by displaying no frames, while picture quality can be increased by displaying all frames. However, in an embodiment wherein the selected compression technology does not include the elimination of redundant frames, system activity can be reduced without reducing picture quality by dropping all frames that are preceded by a frame with identical content.

In general, these two competing goals can be balanced by determining the degree of diversity within the set of frames, and using the degree of diversity in generating the indicator. Degree of diversity is any measure of the differences between the frames within the set. Although some existing compression technologies include a consideration of the degree of diversity between frames, the following exemplary embodiments illustrate how the indicator generation can be based on a particular criterion. In one embodiment, wherein each frame is divided into blocks of 1,200 pixels, and each set comprises one key frame (i.e. a frame from which no blocks have been discarded during interframe compression) and nine delta frames (i.e. a frame from which any blocks that are identical to the corresponding blocks in the preceding frame are discarded during interframe compression), the degree of diversity can be measured by the total number of blocks saved during interframe compression. The degree of diversity is typically increased by motion and lighting changes.

The degree of diversity is low when all of the frames in the set are identical, such as when the video picture is completely static throughout the time period represented by the set. Then, in one embodiment, an indicator can be generated to indicate that only one frame in that set, preferably a key frame, is to be displayed. For another set, the degree of diversity can be relatively low, such as in a set corresponding a "talking head". Then, in one embodiment, an indicator can be generated to indicate that half of the frames in that set are to be displayed. For another set, the degree of diversity can be relatively high, such as in a set corresponding to a basketball game. Then, in one embodiment, an indicator can be generated to indicate that all of the frames in that set are to be displayed.

Any approach to determining the degree of diversity within a set and generating the indicator can be used. In one embodiment, an algorithm is used to determine the degree of diversity within each set and generate the indicators during compression. The algorithm can be implemented as part of the compression hardware or software. In another embodiment, a software or hardware implemented algorithm is used to determine the degree of diversity within each set and to generate the indicators for a previously or a subsequently compressed series of frames. In another embodiment, the degree of diversity within each set is manually determined based on the judgment of one or more people who view the video, and the indicators are automatically generated based on those determinations.

Although the above discussion has used degree of diversity within each set as an example of a criterion in order to illustrate how the indicator generation can be based on a particular criterion, many other criteria or considerations can be used in addition or instead. In one embodiment, wherein there is one frame per set, the degree of diversity between each set is considered. In another embodiment, considerations relating to the content of the video are used to generate indicators calling for frames to be dropped despite a high degree of diversity. For example, in one embodiment, a set corresponding to a camera pan of a scene can have a high degree of diversity, but half of the frames can be dropped without reducing the quality of the picture as perceived by the viewer.

Since some existing compression technologies include a consideration of degree of diversity, many embodiments of the present invention can include no consideration of the degree of diversity. Many other considerations and criteria are possible. The content of portions of the video can be considered, for example, in one embodiment, frames showing advertisements can be dropped. In another embodiment, wherein the series of video frames is associated with an audio stream, the amount of system activity required to play back the portion of the audio stream corresponding to each set is considered. In another embodiment, the generation of the indicators includes a security consideration, such that the indicator indicates that certain frames are to be displayed only under certain conditions, such as on authorized computer systems or by authorized viewers.

Returning to FIG. 1, in step 104, the 7,200 sets of video frame descriptions and the 7,200 indicators are stored on a computer-readable medium. Although any computer-readable medium, such as a magnetic tape or a CD-ROM (compact disk read only memory) can be used, a preferred medium is a digital versatile disk (DVD). Therefore, the computer-readable medium will be referred to as a disk in the remainder of this specification. A preferred logical organization of the disk is to interleave the sets of video frame descriptions with the indicators, such that when the content of the disk is read sequentially, an indicator will be read immediately before the set to which it corresponds. Other embodiments are possible, such as storing all of the indicators at the logical beginning or end of the sequence of video frame descriptions. It is also possible to store the video frame descriptions and the indicators on two or more physically distinct media. It is also possible to store more than one indicator per set on the disk, such as in an embodiment in which indicators are generated according to more than one approach and the viewer can choose which indicators to use.

Figure 2:
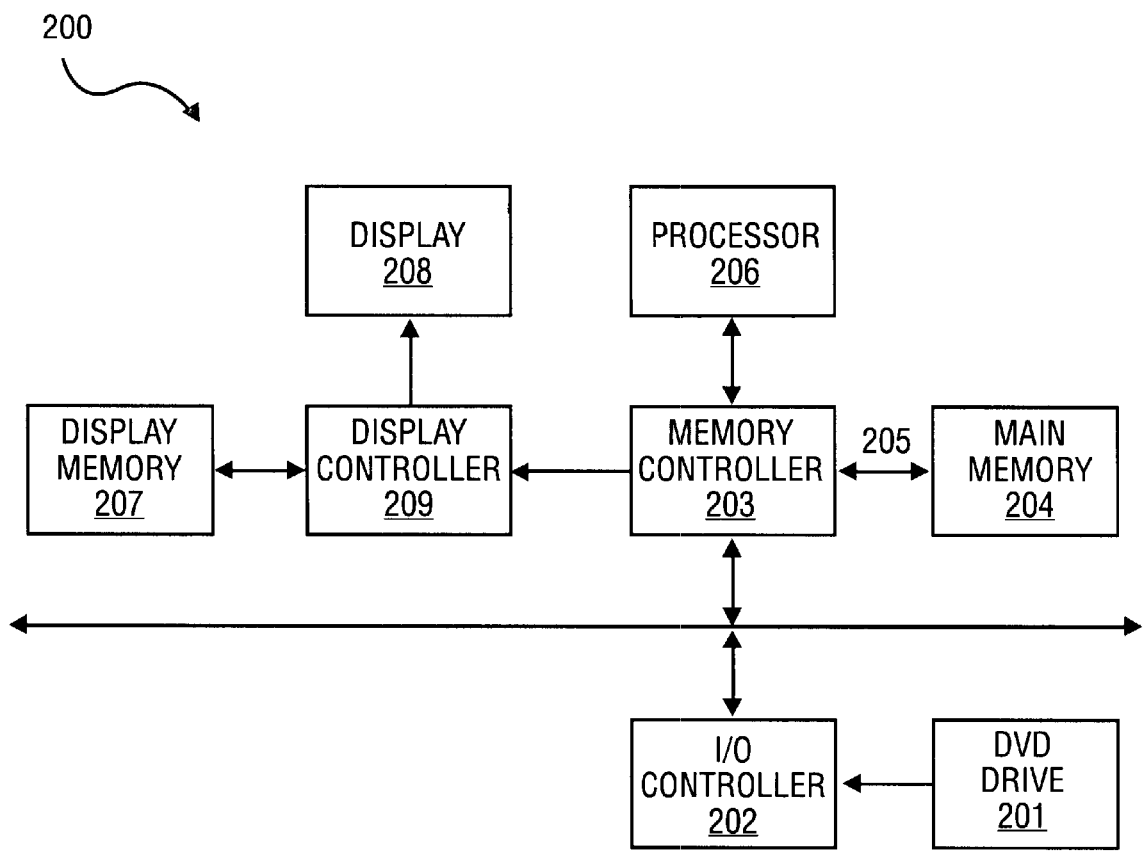
FIG. 2 is a block diagram illustrating one embodiment of the apparatus of the present invention in a computer system.

In step 105, the disk is loaded into a computer system for playback, such as computer system 200 as illustrated in FIG. 2, which depicts one embodiment of the apparatus of the present invention. Step 105 can include any known methods and apparatus for loading any computer-readable media into a computer system. In the embodiment of FIG. 2, the disk is loaded into DVD drive 201. Step 105 can also be omitted, for example, in an embodiment wherein the video frame descriptions and the indicators are transferred to the playback computer system over a networked or point-to-point communication system.

In step 106, an indicator is received into memory 204. In the embodiment of FIG. 2, the indicator is transferred from DVD drive 201 through I/O controller 202 and memory controller 203 and received into main memory 204. However, the indicator can be received into any memory in computer system 200, including a non-volatile secondary memory, such as a hard disk or a flash memory, and a volatile cache, main, or other secondary memory, such as a dynamic random access memory (RAM), a static RAM, a video RAM, or any register within computer system 200. The indicator corresponds to a set of video frame descriptions, which in different embodiments can be subsequently, previously, or simultaneously received. In one embodiment, the indicator is one byte of data that is transferred over a 64 bit memory bus 205 at the same time as the first seven bytes of data from the first video frame description in the set to which the indicator corresponds.

In step 107, one of a set of video frame descriptions is received into memory 204. In the embodiment of FIG. 2, this video frame description is transferred from DVD drive 201 through I/O controller 202 and memory controller 203 and received into main memory 204. However, this video frame description can be received into any memory in computer system 200, including any of those listed in step 106. Furthermore, this video frame description can be received into the same memory as the indicator or a different memory. In one embodiment, the completion of step 107 requires multiple transfers of data from DVD drive 201 to main memory 204.

In step 108, a subset of video frame descriptions is selected from the set of video frame descriptions comprising the video frame description received in step 107. The subset is selected based on the indicator received in step 106. It is possible for step 108 to be performed subsequent to, prior to, or during step 107. In one embodiment, step 108 can be selectively omitted such that no frames are dropped during playback. Whether to omit step 108 can depend on a decision by the user of computer system 200, or on a condition of computer system 200, such as whether or not computer system 200 is attached to an AC power supply.

In step 109, one of the video frame descriptions in the set selected in step 108 is decompressed by processor 206, generating a decompressed video frame. In one embodiment, only the video frame descriptions in the subset, but not those in the remainder of the set, are decompressed. In another embodiment, all of the video frame descriptions in the subset are decompressed, plus certain other video frame descriptions, such as any key frames that are in the set but not the subset. In another embodiment, all of the video frame descriptions in the set are decompressed, including those that are not in the subset.

In step 110, the decompressed video frame generated in step 109 is transferred to display memory 207. In one embodiment, the decompressed video frame is transferred into display memory 207 immediately after decompression. In another embodiment, the decompressed video frame is transferred into display memory 207 after an intervening transfer into an operating system buffer in main memory 204. In one embodiment, where video frame descriptions that are not in the subset are decompressed in step 109, step 110 is omitted for those decompressed video frames that are not represented in the subset.

In step 111, the decompressed video frame transferred in step 110 is displayed on display device 208. Display device 208 can be any known type of display device, such as a cathode ray tube or a liquid crystal display. In one embodiment, the displaying of the decompressed video frame includes the conversion of the decompressed video frame from a digital format to an analog format by display controller 209. In one embodiment, wherein decompressed video frames not represented in the subset are transferred in step 110, step 111 is omitted for those decompressed video frames that are not represented in the subset.

In another embodiment, for those video frames that are not represented in the subset, step 111 is replaced by a step in which the video frame that dropped (i.e. not represented in the subset), is replaced with another video frame. This other video frame can be a blank frame, the most recently displayed frame, the frame to be subsequently displayed, or a frame that has been generated from other frames by interpolation. This embodiment, in which dropped frames are replaced rather than not displayed, can be used to maintain the temporal relationship between the video track and an accompanying audio track. In another embodiment, wherein the indicators have been used to remove entire scenes, the dropped video frames are not displayed or replaced, and the entire accompanying audio track is not played or replaced.

Following step 111, in one embodiment, steps 107, 109, 110, and 111 are repeated for any remaining video frame descriptions in the subset selected in step 108. This repetition is represented by step 112 in FIG. 1.

After all of the video frames in the subset have been displayed, in one embodiment, steps 106–112 are repeated for any remaining sets of video frame descriptions. This repetition is represented by step 113 in FIG. 1. In this embodiment, each set of video frame descriptions corresponding to each repetition of step 108 is one of a plurality of sets video frame descriptions comprised in a data stream to be received into memory 204 from the disk loaded in step 105. Likewise, each indicator received in each repetition of step 106 is one of a plurality of indicators comprised in the data stream to be received into memory 204 from the disk loaded in step 105, and each indicator corresponds to a set of video frame descriptions received in the corresponding step 107. In another embodiment, step 106 includes receiving a plurality of indicators into memory 204 prior to receiving any of the video frame descriptions, such that steps 107–112, but not step 106, are repeated for a plurality of video frame descriptions. In another embodiment, step 107 is omitted for one or more video frame descriptions that are not included in the subset selected in step 108.

The previous embodiments of the present invention used the indicators to determine what to display over time. Other embodiments, that use the indicators to determine what to display over space are also possible. Again, the determination of what to display does not need to be made in real time, so there can be many ways to improve the displayed graphics according to a predetermined policy. For example, the display area can be subdivided, and the indicators generated, in different ways depending on the content of the graphic to be displayed.

One such embodiment of the present invention is a method for displaying graphical pages from a networked database, for example, a web page from the internet. In this embodiment, a web page is divided into a set of subpages based on an overlay grid. For example, an overlay grid could divide a web page into 64 columns and 32 rows of subpages. Then, an 11 bit indicator could be used to identify any particular subpage. Indicators could be associated with any web page to identify areas of the web page that a viewer did not want to display or download, for example, advertisements.

Thus, a number of exemplary embodiments of the present invention have been described. However, the invention is not limited to the embodiments or any of the details described. The specification and drawings must be regarded in an illustrative rather than a restrictive sense. The scope of the invention is defined by the following claims.

What is claimed is:

1. A method of displaying graphics in a computer system comprising:

receiving at least one set of graphical descriptors, each graphical descriptor corresponding to a graphical image of a streaming video;

selecting a subset of said at least one set of graphical descriptors based on at least one indicator indicating whether to display a graphical image corresponding to said graphical descriptor, and wherein said indicator is one of a plurality indicators received, each indicator corresponding to one of a plurality of sets of graphical descriptors;

decompressing the graphical images corresponding to said selected subset of graphical descriptors;

displaying the graphical images corresponding to said selected subset of graphical descriptors; and dropping compressed graphical images corresponding to unselected graphical descriptors.

2. The method as set forth in claim 1 wherein said at least one indicator is based upon at least one predetermined policy.

3. A method of displaying video in a computer system, said method comprising:

receiving at least one set of video frame descriptions, each video frame description corresponding to a video frame;

selecting a subset of said at least one set of video frame descriptions based on at least one indicator indicating whether to display a first video frame corresponding to a first video frame description, and wherein said indicator is one of a plurality indicators received, each indicator corresponding to one of a plurality of sets of video frame descriptions;

decompressing the video frames corresponding to said selected subset of video frame descriptions;

displaying the video frames corresponding to said selected subset of video frame descriptions; and dropping compressed video frames corresponding to unselected video frame descriptions.

4. The method of claim 3 wherein said displaying the video frames corresponding to said subset of video frame descriptions includes a step of decompressing each of said subset of video frame descriptions.

5. The method of claim 3 wherein said set of video frame descriptions consists of said first video frame description.

6. The method of claim 3 wherein said indicator indicates a numerical quantity of video frame descriptions to be selected.

7. A method of compressing digital video, said method comprising:

compressing a set of video frames to create a set of video frame descriptions;

generating an indicator corresponding to said set of video frame descriptions, said indicator to indicate a basis for selecting whether to display a subset of said set of video frames corresponding to said set of video frame descriptions are;

selecting prior to run time said subset of said set of video frames to be displayed, wherein unselected video frames will be dropped at run time; and transmitting said video frame descriptions and said indicator.

8. The method of claim 3 wherein said generating said indicator comprises a determination of the degree of diversity within said set of video frames.

9. A computer system comprising:

a memory for storing at least one set of video frame descriptions, each video frame description corresponding to a video frame;

a data processing device configured to select a subset of said at least one set of video frame descriptions based on at least one indicator, said indicator corresponding to said set of video frame descriptions, and wherein said indicator to indicate whether to display a video frame corresponding to said video frame descriptions, said data processing device further to decompress video frames corresponding to said selected subset of video frame descriptions and to drop video frames corresponding to unselected video frame descriptions; and a display device for displaying the video frames corresponding to said subset of video frame descriptions.

10. A method for processing graphical images in a computer system comparing:

receiving a set of graphical descriptors, each graphical descriptor corresponding to a compressed graphical image of a streaming video;

selecting a subset of the set of graphical descriptors based upon at least one indicator, said indicator to indicate whether to display graphical images corresponding to said graphical descriptors, and wherein said indicator is one of a plurality indicators received, each indicator corresponding to one of a plurality of sets of graphical descriptors; and decompressing only those compressed graphical images corresponding to the selected subset of graphical descriptors.

11. The method as set forth in claim 10, further comprising displaying the decompressed graphical images.

12. The method as set forth in claim 10, wherein the indicator is based upon at least one predetermined policy.

13. A computer system comprising:

a memory to store graphical images from a video stream, each graphical image having a corresponding graphical descriptor;

a processor to select at least one set of graphical descriptors based on at least one indicator, said indicator corresponding to said set of graphical descriptors and indicating whether to display a graphical image corresponding to each selected graphical descriptor, said processor further to decompress graphical images corresponding to said selected subset of graphical descriptors and to drop graphical images corresponding to unselected graphical descriptors; and a display to display graphical images corresponding to the selected at least one set of graphical descriptors.

14. The computer system as set forth in claim 13, wherein the indicator is based upon at least one predetermined policy.

15. The computer system as set forth in claim 13, wherein the system further comprises an input to receive compressed graphical images having corresponding graphical descriptors, the processor further decompressing only those compressed graphical images corresponding to the selected at least one set of graphical descriptors.

16. A computer readable medium comprising instructions, which when executed by a processing system, performs the steps comprising:

receiving at least one of graphical descriptors, each graphical descriptor corresponding to a graphical image of a digital video stream;

selecting a subset of said at least one set of graphical descriptors based on at least one indicator, said indicator indicating whether to display a graphical image corresponding to said graphical descriptor, wherein each indicator to correspond to one of a plurality of sets of graphical descriptors;

decompressing graphical images corresponding to said selected subset of graphical descriptors;

displaying the graphical images corresponding to said selected subset of graphical descriptors; and dropping compressed graphical images corresponding to unselected graphical descriptors.

* * * * *